US012103359B2

(12) United States Patent
Hasegawa et al.

(10) Patent No.: US 12,103,359 B2
(45) Date of Patent: Oct. 1, 2024

(54) VEHICULAR THERMAL MANAGEMENT SYSTEM AND CORRESPONDING METHOD OF CONTROLLING THE THERMAL MANAGEMENT SYSTEM

(71) Applicants: TOYOTA JIDOSHA KABUSHIKI KAISHA, Toyota (JP); SUBARU CORPORATION, Tokyo (JP)

(72) Inventors: Yoshio Hasegawa, Toyota (JP); Masatoshi Hiyoshi, Toyota (JP); Haruka Tsuruta, Toyota (JP)

(73) Assignees: TOYOTA JIDOSHA KABUSHIKI KAISHA, Toyota Aichi-ken (JP); SUBARU CORPORATION, Shibuy-ku Tokyo (JP)

( * ) Notice: Subject to any disclaimer, the term of this patent is extended or adjusted under 35 U.S.C. 154(b) by 61 days.

(21) Appl. No.: 17/739,324

(22) Filed: May 9, 2022

(65) Prior Publication Data

US 2022/0396123 A1 Dec. 15, 2022

(30) Foreign Application Priority Data

Jun. 15, 2021 (JP) ................................. 2021-099170

(51) Int. Cl.
*B60H 1/00* (2006.01)
*B60K 1/00* (2006.01)
(Continued)

(52) U.S. Cl.
CPC ..... *B60H 1/00899* (2013.01); *B60H 1/00271* (2013.01); *B60H 1/00485* (2013.01);
(Continued)

(58) Field of Classification Search
CPC ............ B60H 1/00899; B60H 1/00271; B60H 1/00485; B60H 1/00885; B60H 1/04;
(Continued)

(56) References Cited

U.S. PATENT DOCUMENTS 5,648,182 A * 7/1997 Hara ................... H01M 8/0612
429/423
7,178,358 B2 * 2/2007 Inaba ..................... F25B 27/00
62/238.4
(Continued)

FOREIGN PATENT DOCUMENTS

CN 108136874 A * 6/2018 ............... B60H 1/00
DE 102013209045 A1 * 11/2014 ............. B60K 11/02
(Continued)

*Primary Examiner* — Ljiljana V. Ciric
(74) *Attorney, Agent, or Firm* — Dinsmore & Shohl LLP (57) ABSTRACT

A thermal management system includes a first cooler that cools a first heat source, a first circulation path that connects the first cooler and a first pump, a second cooler that cools a second heat source, a second circulation path that connects the second cooler and a second pump, a changeover valve, and a controller. The changeover valve is switchable between first and second valve positions. The first and second circulation paths are separated from each other when the changeover valve is in the first valve position. The controller causes both the first and second pumps to operate when the temperature difference between refrigerants in the first and second circulation paths is more than a predetermined temperature difference threshold when the changeover valve is set to the first valve position and one of the first and second pumps is operating and the other is not operating.

9 Claims, 8 Drawing Sheets (51) Int. Cl.
    *B60K 1/04*           (2019.01)
    *B60K 11/02*        (2006.01)
    *B60L 1/00*          (2006.01)
    *B60L 1/02*          (2006.01)
    *B60L 58/26*        (2019.01)

(52) U.S. Cl.
    CPC ........... *B60H 1/00885* (2013.01); *B60K 1/04* (2013.01); *B60K 11/02* (2013.01); *B60L 1/003* (2013.01); *B60L 1/02* (2013.01); *B60L 58/26* (2019.02); *B60K 2001/003* (2013.01); *B60K 2001/005* (2013.01); *B60K 2001/006* (2013.01); *B60L 2240/545* (2013.01)

(58) Field of Classification Search
    CPC .... B60K 1/04; B60K 11/02; B60K 2001/003; B60K 2001/005; B60K 2001/006; B60K 1/00; B60L 1/003; B60L 1/02; B60L 58/26; B60L 2240/545
    See application file for complete search history.

(56) References Cited

U.S. PATENT DOCUMENTS

| | | | |
|---|---|---|---|
| 7,797,954 B2 * | 9/2010 | Duhme | B60H 1/00278 62/185 |
| 9,604,627 B2 * | 3/2017 | Yamanaka | B60K 1/04 |
| 9,994,087 B2 * | 6/2018 | Enomoto | B60H 1/22 |
| 10,183,548 B2 * | 1/2019 | Enomoto | B60H 1/00485 |
| 10,369,866 B2 * | 8/2019 | Yamanaka | B60H 1/00278 |
| 10,391,834 B2 * | 8/2019 | Enomoto | F25B 25/005 |
| 10,428,720 B2 * | 10/2019 | Hasegawa | F01P 3/02 |
| 10,449,830 B2 * | 10/2019 | Sugimura | B60H 1/3213 |
| 10,479,170 B2 * | 11/2019 | Enomoto | B60H 1/00428 |
| 10,562,376 B2 * | 2/2020 | Miura | B60H 1/00899 |
| 10,570,805 B2 * | 2/2020 | Uto | F01P 7/14 |
| 10,906,376 B2 * | 2/2021 | Enomoto | F01P 7/161 |
| 11,098,935 B2 * | 8/2021 | Heyl | C09K 5/045 |
| 11,302,523 B1 * | 4/2022 | Creissen | B05B 7/0815 |
| 11,318,814 B2 * | 5/2022 | Maeda | B60K 6/40 |
| 11,396,228 B2 * | 7/2022 | Kawabe | B60L 1/02 |
| 11,584,258 B2 * | 2/2023 | Aikawa | B60H 1/00278 |
| 11,642,958 B2 * | 5/2023 | Kawabe | B60L 1/003 123/41.31 |
| 11,760,154 B2 * | 9/2023 | Miyoshi | B60H 1/00007 62/159 |
| 11,780,293 B2 * | 10/2023 | Miyoshi | B60H 1/00278 165/41 |
| 2002/0014330 A1 * | 2/2002 | Guyonvarch | B60H 1/32284 62/434 |
| 2009/0205353 A1 * | 8/2009 | Takahashi | B60H 1/00899 62/324.1 |
| 2012/0297805 A1 * | 11/2012 | Kamada | B60H 1/32281 62/208 |
| 2013/0055743 A1 * | 3/2013 | Ogasawara | B60H 1/321 62/159 |
| 2013/0061627 A1 * | 3/2013 | Neumeister | B60L 58/27 165/96 |
| 2015/0128632 A1 * | 5/2015 | Kishita | B60H 1/00278 165/61 |
| 2016/0031291 A1 * | 2/2016 | Enomoto | B60K 11/02 62/189 |
| 2016/0075213 A1 * | 3/2016 | Sugimura | B60H 1/00899 62/324.1 |
| 2016/0109163 A1 * | 4/2016 | Enomoto | F25B 13/00 62/160 |
| 2016/0167481 A1 | 6/2016 | Makihara et al. | |
| 2016/0318370 A1 * | 11/2016 | Rawlinson | B60H 1/32281 |
| 2016/0339767 A1 * | 11/2016 | Enomoto | B60H 1/00864 |
| 2017/0021698 A1 * | 1/2017 | Hatakeyama | B60H 1/143 |
| 2017/0253104 A1 * | 9/2017 | Amano | B60H 1/00314 |
| 2018/0201096 A1 * | 7/2018 | Tsubouchi | F25B 17/08 |
| 2018/0264913 A1 * | 9/2018 | Enomoto | B60H 1/32284 |
| 2018/0354344 A1 * | 12/2018 | Miura | B60H 1/08 |
| 2019/0070951 A1 * | 3/2019 | Lucke | H01M 10/625 |
| 2020/0127352 A1 * | 4/2020 | Tokozakura | F16N 39/02 |
| 2021/0094443 A1 * | 4/2021 | Aikawa | B60L 58/26 |
| 2022/0371402 A1 * | 11/2022 | Hasegawa | B60H 1/32284 |
| 2022/0371404 A1 * | 11/2022 | Hasegawa | B60H 1/143 |
| 2022/0396123 A1 * | 12/2022 | Hasegawa | B60K 11/02 |
| 2022/0410655 A1 * | 12/2022 | Lee | B60K 11/02 |
| 2024/0059417 A1 * | 2/2024 | Lynn | H01M 10/486 |

FOREIGN PATENT DOCUMENTS

| | | | | |
|---|---|---|---|---|
| DE | 112013003104 T5 * | 3/2015 | | B60H 1/00278 |
| DE | 112012000522 B4 * | 12/2020 | | B60H 1/00007 |
| DE | 102020129589 A1 * | 5/2021 | | |
| DE | 112016005644 B4 * | 10/2021 | | B60H 1/00899 |
| DE | 112017000940 B4 * | 7/2022 | | B60H 1/00 |
| DE | 102021204380 B4 * | 1/2023 | | |
| EP | 2090448 A1 * | 8/2009 | | B60H 1/00899 |
| JP | 2003120965 A * | 4/2003 | | |
| JP | 2014000906 A * | 1/2014 | | B60H 1/00278 |
| JP | 2015-030289 A | 2/2015 | | |
| JP | 2020-200943 A | 12/2020 | | |
| JP | 2021-042809 A | 3/2021 | | |

* cited by examiner

VEHICULAR THERMAL MANAGEMENT SYSTEM AND CORRESPONDING METHOD OF CONTROLLING THE THERMAL MANAGEMENT SYSTEM

CROSS-REFERENCE TO RELATED APPLICATION

This application claims priority to Japanese Patent Application No. 2021-099170 filed on Jun. 15, 2021, incorporated herein by reference in its entirety.

BACKGROUND

1. Technical Field

The technology disclosed herein relates to a thermal management system and a method of controlling a thermal management system.

2. Description of Related Art

Thermal management systems that include a plurality of heat sources and coolers corresponding to the heat sources are known. Japanese Unexamined Patent Application Publication No. 2015-30289 (JP 2015-30289 A) discloses an example of such thermal management systems. The thermal management system according to JP 2015-30289 A includes a plurality of flow paths that connects a plurality of coolers and a plurality of pumps, and includes a changeover valve that switches the relationship of connection among the flow paths in accordance with the temperature of a refrigerant. Japanese Unexamined Patent Application Publication No. 2021-42809 (JP 2021-42809 A) and Japanese Unexamined Patent Application Publication No. 2020-200943 (JP 2020-200943 A), for example, disclose examples of the structure of the changeover valve.

SUMMARY

A leak of the refrigerant may be caused in changeover valves that switch the relationship of connection among a plurality of flow paths (e.g. the changeover valves according to JP 2021-42809 A and JP 2020-200943 A). For example, there is known a changeover valve that switches between a first valve position, at which a first flow path is connected to a third flow path and a second flow path is connected to a fourth flow path, and a second valve position, at which the first flow path is connected to the fourth flow path and the second flow path is connected to the third flow path. When the refrigerant flows through the first flow path and the third flow path and the refrigerant in the second flow path and the fourth flow path is stationary in a situation in which the first valve position is selected, the valve position may vary due to a pressure difference in the changeover valve and the refrigerant may be leaked from the first flow path to the second flow path or the fourth flow path. Alternatively, when the refrigerant flows through the first flow path and the fourth flow path and the refrigerant in the second flow path and the third flow path is stationary in a situation in which the second valve position is selected, the valve position may be changed due to a pressure difference in the changeover valve and the refrigerant may be leaked from the first flow path to the second flow path or the third flow path. Movement of the refrigerant between the flow paths may lower the cooling efficiency when the temperature difference between the refrigerant in the first flow path and the refrigerant in the second flow path is large. The present disclosure provides a technology of suppressing mixing of refrigerants with a temperature difference therebetween in a thermal management system that includes a changeover valve that switches the relationship of connection among flow paths.

A first aspect of the present disclosure provides a thermal management system including a first cooler that cools a first heat source, a first circulation path that connects the first cooler and a first pump, a second cooler that cools a second heat source, a second circulation path that connects the second cooler and a second pump, a changeover valve, and a controller. The changeover valve is switchable between a first valve position and a second valve position. The first circulation path and the second circulation path are separated from each other when the changeover valve is in the first valve position. The first circulation path and the second circulation path communicate with each other when the changeover valve is in the second valve position. The controller causes both the first pump and the second pump to operate in a case where a temperature difference between a refrigerant in the first circulation path and a refrigerant in the second circulation path is more than a predetermined temperature difference threshold when the changeover valve is set to the first valve position and one of the first pump and the second pump is operating and another is not operating.

The controller normally sets the changeover valve to the first valve position, drives the first pump when the temperature of the refrigerant in the first circulation path is high, and stops the first pump when the temperature of the refrigerant in the first circulation path is low. The controller drives the second pump when the temperature of the refrigerant in the second circulation path is high, and stops the second pump when the temperature of the refrigerant in the second circulation path is low. When one of the pumps is operating and the other is not operating, a pressure difference may occur in the changeover valve, and the refrigerant in the flow path at a higher pressure may leak to the flow path at a lower pressure.

When the temperature difference between the refrigerants in the two circulation paths is small, there is no problem if the refrigerant is leaked from one of the circulation paths to the other. When the temperature difference between the refrigerants in the two circulation paths is large, however, the cooling efficiency may be lowered if the refrigerant is leaked from one of the circulation paths to the other. Thus, the controller causes both the first pump and the second pump to operate when the temperature difference between the refrigerants in the two circulation paths is more than the predetermined temperature difference threshold. Causing both the pumps to operate reduces the pressure difference in the changeover valve, which suppresses a leak of the refrigerant.

In the thermal management system according to the aspect described above, an example of the first heat source may be a motor for travel, and an example of the second heat source may be a power source that supplies electric power to the motor. In this case, when a temperature of the refrigerant in the first circulation path is higher than a predetermined upper limit temperature, the controller may determine that the temperature difference is more than the temperature difference threshold and cause the first pump and the second pump to operate. The upper limit of the allowable temperature range of the motor is occasionally much higher than the upper limit of the allowable temperature range of the power source. In such a case, it may be determined that the temperature difference between the refrigerants in the first circulation path and the second circulation path is more than the temperature difference threshold when the temperature of the refrigerant in the first circulation path for cooling the motor is higher than the upper limit temperature.

In the thermal management system according to the aspect described above, the controller may stop the second pump while a temperature of the refrigerant in the second circulation path is lower than a predetermined temperature threshold, while the changeover valve is set to the first valve position. However, the controller may cause both the first pump and the second pump to operate, irrespective of the temperature of the refrigerant in the second circulation path, when the temperature difference between the refrigerant in the first circulation path and the refrigerant in the second circulation path is more than the temperature difference threshold.

In the thermal management system according to the aspect described above, the controller may drive both the first pump and the second pump with the same output.

A second aspect of the present disclosure provides a method of controlling a thermal management system, the thermal management system including a first cooler that cools a first heat source, a first circulation path that connects the first cooler and a first pump, a second cooler that cools a second heat source; a second circulation path that connects the second cooler and a second pump, and a changeover valve that switches between a first valve position at which the first circulation path and the second circulation path are separated from each other, and a second valve position at which the first circulation path and the second circulation path communicate with each other. The method includes: when the changeover valve is set to the first valve position and one of the first pump and the second pump is operating and another is not operating, comparing a temperature of a refrigerant in the first circulation path with a temperature of a refrigerant in the second circulation path; and causing both the first pump and the second pump to operate when a difference between the temperature of the refrigerant in the first circulation path and the temperature of the refrigerant in the second circulation path is more than a predetermined temperature difference threshold.

Details and further improvements of the technology disclosed herein will be described in the "DETAILED DESCRIPTION OF EMBODIMENTS" section below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
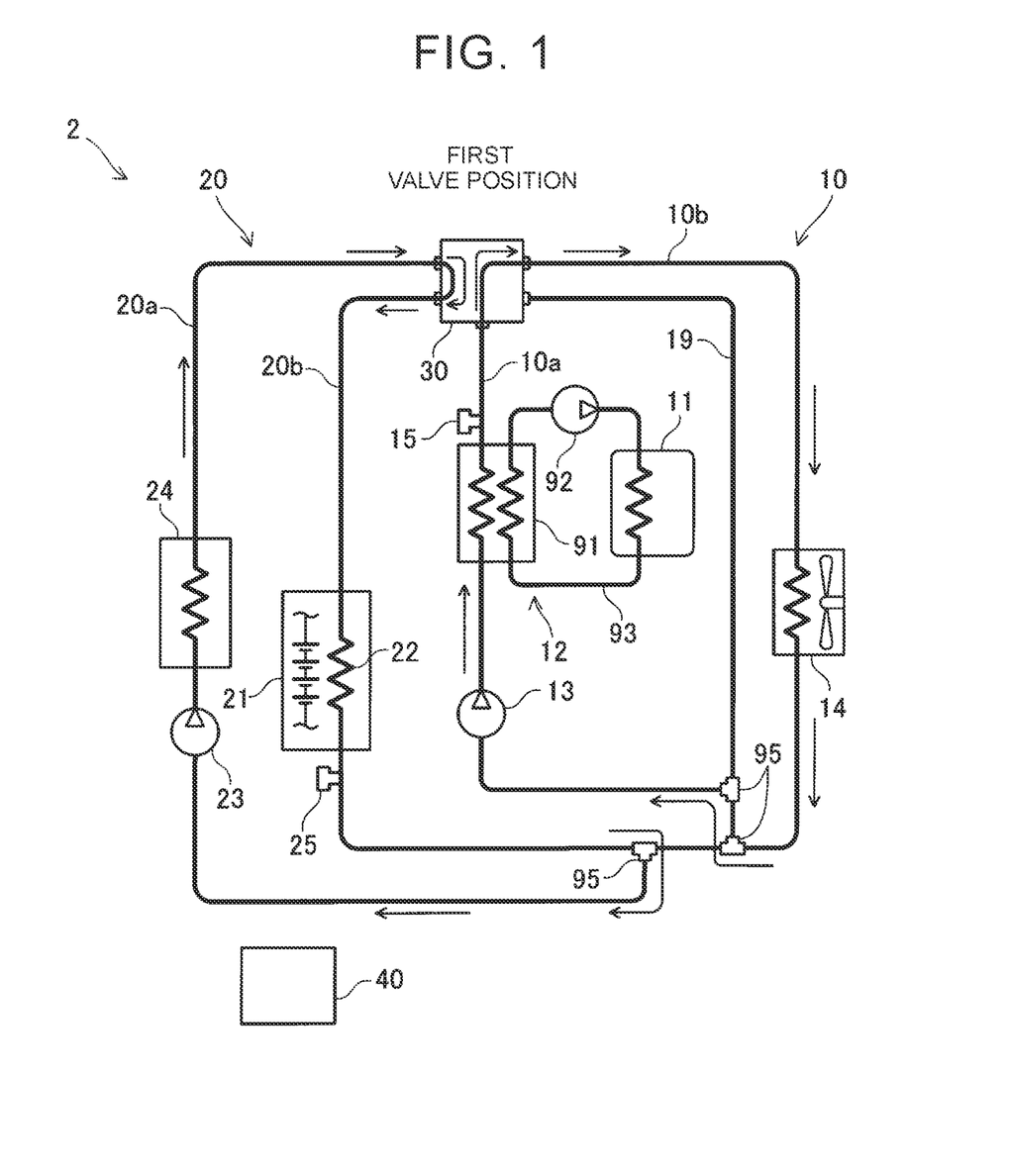
FIG. 1 is a thermal circuit diagram of a thermal management system according to a first embodiment (first valve position)

A thermal management system 2 according to a first embodiment will be described with reference to the drawings. FIG. 1 is a thermal circuit diagram of the thermal management system 2. The term "thermal circuit" as used herein means a circuit of flow paths through which a refrigerant flows.

The thermal management system 2 is mounted on a battery electric vehicle, and cools a power source 21 and a motor 11 for travel. The electric power of the power source 21 is converted by a power converter (not illustrated) into alternating current (AC) power that is suitable to drive the motor 11, and supplied to the motor 11. The power source 21 is typically a battery such as a lithium-ion battery or a fuel cell, and may be a power source of other kinds. Power lines are not illustrated in FIG. 1.

The thermal management system 2 includes a first circulation path 10 and a second circulation path 20 through which a refrigerant flows, a first cooler 12 that cools the motor 11, a second cooler 22 that cools the power source 21, a first heat exchanger 14 that cools a refrigerant that passes through the first circulation path 10, a second heat exchanger 24 that cools a refrigerant that passes through the second circulation path 20, a changeover valve 30 that switches between flow paths for the refrigerant, and a controller 40.

The first circulation path 10 is a pipe that connects the first cooler 12 and the first heat exchanger 14, and circulates the refrigerant between the first cooler 12 and the first heat exchanger 14. The first circulation path 10 is provided with a first pump 13. The first pump 13 pumps the refrigerant in the first circulation path 10.

The first cooler 12 includes an oil cooler 91, an oil pump 92, and an oil flow path 93. The first circulation path 10 passes through the oil cooler 91. The oil flow path 93 passes through the oil cooler 91 and the motor 11. Oil flows through the oil flow path 93. The oil pump 92 is disposed in the oil flow path 93, and circulates the oil between the oil cooler 91 and the motor 11. The motor 11 is cooled by the refrigerant that flows through the first circulation path 10. More specifically, the refrigerant cools the oil in the oil cooler 91, and the cooled oil cools the motor 11. The heat from the motor 11 is absorbed by the refrigerant via the oil.

The second circulation path 20 is a pipe that connects the second cooler 22 and the second heat exchanger 24, and circulates the refrigerant between the second cooler 22 and the second heat exchanger 24. The second circulation path 20 is provided with a second pump 23. The second pump 23 pumps the refrigerant in the second circulation path 20. The refrigerant that passes through the second cooler 22 cools the power source 21. The refrigerant that has been heated by the heat from the power source 21 is cooled by the second heat exchanger 24.

The thermal management system 2 includes temperature sensors 15 and 25. The temperature sensor 15 measures the temperature of the refrigerant in the first circulation path 10. The temperature sensor 25 measures the temperature of the refrigerant in the second circulation path 20. While the thermal management system 2 includes further temperature sensors, such temperature sensors are not described herein.

Measured values from the temperature sensors 15 and 25 are sent to the controller 40. The controller 40 controls the first pump 13 based on the measured value from the temperature sensor 15, and controls the second pump 23 based on the measured value from the temperature sensor 25. The controller 40 may be a processor, an electronic control unit (ECU), etc., for example.

Both the first circulation path 10 and the second circulation path 20 pass through the changeover valve 30. For the convenience of description, the first circulation path 10 is divided into a flow path 10*a* and a flow path 10*b*, and the second circulation path 20 is divided into a flow path 20*a* and a flow path 20*b*. The first circulation path 10 is provided with a bypass flow path 19. First ends of the flow paths 10*a*, 10*b*, 20*a*, and 20*b* and the bypass flow path 19 are connected to the changeover valve 30. The changeover valve 30 switches the relationship of connection among such flow paths.

Second ends of the flow paths 10*a*, 10*b*, 20*a*, and 20*b* and the bypass flow path 19 are coupled to each other by several three-way valves 95. The first pump 13 disposed in the first circulation path 10 and the second pump 23 disposed in the second circulation path 20 pump the refrigerant toward the changeover valve 30. The route of the refrigerant is determined in accordance with the state of the changeover valve 30. The direction in which the refrigerant flows in each of the plurality of three-way valves 95 is determined dependently in accordance with the route of the refrigerant.

The changeover valve 30 can select one of a first valve position and a second valve position. The arrowed lines in FIG. 1 indicate the flow of the refrigerant at the time when the changeover valve 30 is in the first valve position. When the first valve position is selected, the changeover valve 30 connects the flow path 10*a* and the flow path 10*b*, and connects the flow path 20*a* and 20*b*. As discussed earlier, the flow paths 10*a* and 10*b* constitute the first circulation path 10, and the flow paths 20*a* and 20*b* constitute the second circulation path 20. The changeover valve 30 that is in the first valve position separates the first circulation path 10 and the second circulation path 20 from each other. While the second ends of the flow paths 10*a*, 10*b*, 20*a*, and 20*b* and the bypass flow path 19 are coupled to each other by the several three-way valves 95 as discussed earlier, the refrigerant that flows through the first circulation path 10 and the refrigerant that flows through the second circulation path 20 are not mixed with each other when the changeover valve 30 is in the first valve position.

When the changeover valve 30 is in the first valve position, the first circulation path 10 and the second circulation path are separated from each other. At this time, the controller 40 keeps the temperature of the refrigerant in the first circulation path 10 (i.e. the temperature of the motor 11) at or lower than a predetermined first temperature threshold by controlling the first pump 13. When the temperature of the refrigerant in the first circulation path 10 is higher than the first temperature threshold, the controller 40 drives the first pump 13 to circulate the refrigerant between the first cooler 12 and the first heat exchanger 14. The temperature of the refrigerant in the first circulation path 10 is measured by the temperature sensor 15. The first heat exchanger 14 is a radiator, and releases the heat of the refrigerant in the first circulation path 10 to the outside air. When the temperature of the refrigerant in the first circulation path 10 is lower than the first temperature threshold, the controller 40 stops the first pump 13. Specifically, the controller 40 stops the first pump 13 when the temperature of the refrigerant in the first circulation path 10 is lower than a temperature obtained by subtracting a margin temperature from the first temperature threshold, in order to suppress hunting of the first pump 13.

In addition, the controller 40 keeps the temperature of the refrigerant in the second circulation path 20 (i.e. the temperature of the power source 21) at or lower than a predetermined second temperature threshold by controlling the second pump 23. When the temperature of the refrigerant in the second circulation path 20 is higher than the second temperature threshold, the controller 40 drives the second pump 23 to circulate the refrigerant between the second cooler 22 and the second heat exchanger 24. The temperature of the refrigerant in the second circulation path 20 is measured by the temperature sensor 25. The second heat exchanger 24 is a vehicle cabin air conditioner including a radiator, and releases the heat of the refrigerant in the second circulation path 20 to the outside air. When the temperature of the refrigerant in the second circulation path 20 is lower than the second temperature threshold, the controller 40 stops the second pump 23. More specifically, the controller 40 stops the second pump 23 when the temperature of the refrigerant in the second circulation path 20 is lower than a temperature obtained by subtracting a margin temperature from the second temperature threshold, in order to suppress hunting of the second pump 23.

As discussed earlier, the second heat exchanger 24 is a vehicle cabin air conditioner, and occasionally heats the vehicle cabin using the heat from the power source 21. When the temperature of the power source 21 is lower than the temperature of the outside air, meanwhile, the heat from the outside air is occasionally used for heating of the vehicle cabin. When the heat from the outside air is used for heating of the vehicle cabin, the controller 40 sets the changeover valve 30 to the second valve position.

Figure 2:
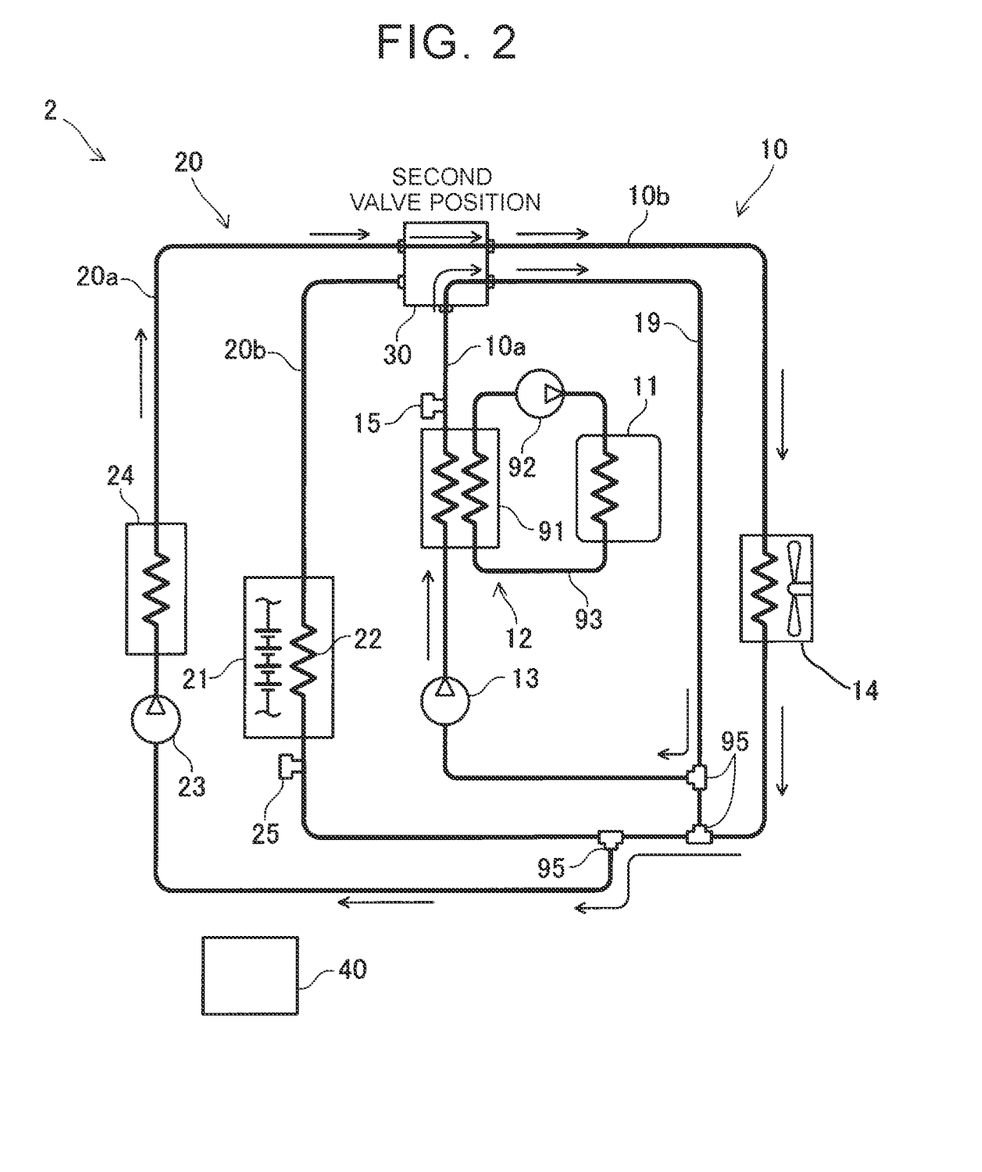
FIG. 2 is a thermal circuit diagram of the thermal management system according to the first embodiment (second valve position)

FIG. 2 illustrates a thermal circuit at the time when the changeover valve 30 is in the second valve position. The arrowed lines in FIG. 2 indicate the flow of the refrigerant at the time when the changeover valve 30 is in the second valve position. When the second valve position is selected, the changeover valve 30 connects the flow path 10*b* and the flow path 20*a*, and connects the flow path 10*a* and the bypass flow path 19. When the changeover valve 30 is in the second valve position, a part of the first circulation path 10 (flow path 10*b*) and a part of the second circulation path 20 (flow path 20*a*) are connected to each other. In other words, the changeover valve 30 communicates the first circulation path 10 and the second circulation path 20 with each other when the second valve position is selected.

Figure 3:
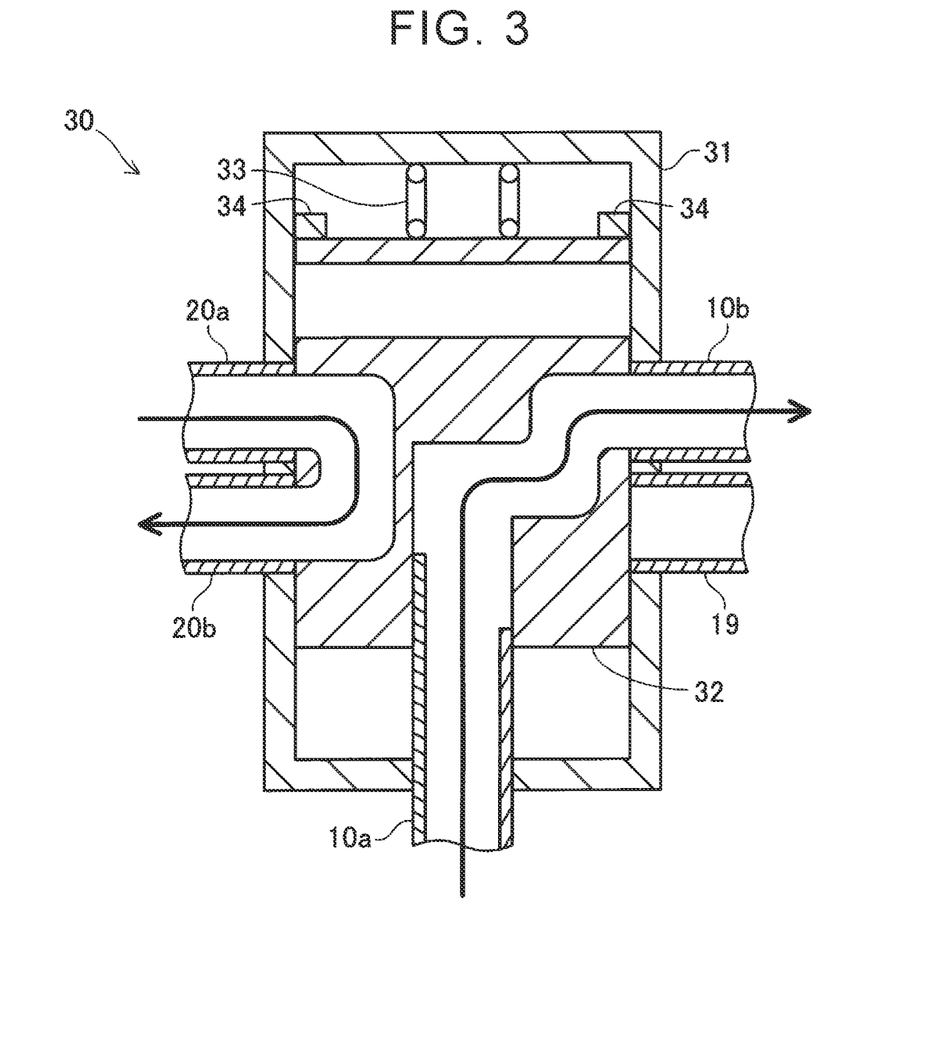
FIG. 3 is a sectional view illustrating an example of a structure of a changeover valve (first valve position)
Figure 4:
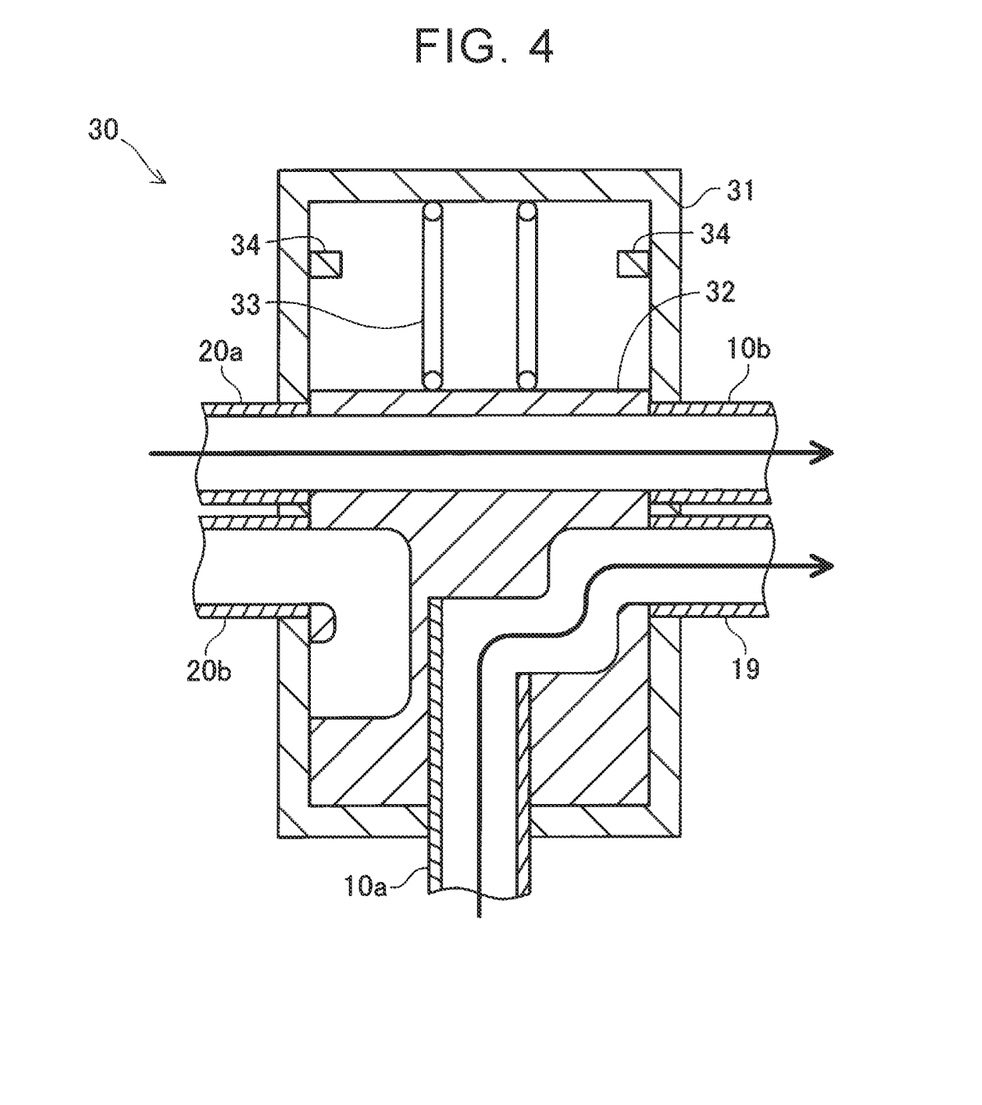
FIG. 4 is a sectional view illustrating an example of a structure of the changeover valve (second valve position)

The structure of the changeover valve 30 will be described. FIGS. 3 and 4 are each a sectional view of the changeover valve 30. The changeover valve 30 includes a case 31, a piston valve 32, a spring 33, a stopper 34, and a solenoid actuator (not illustrated). FIG. 3 illustrates a sectional view at the time when the piston valve 32 is positioned at the first valve position. FIG. 4 illustrates a sectional view at the time when the piston valve 32 is positioned at the second valve position. Several paths are provided in the piston valve 32. The arrowed lines in FIGS. 3 and 4 indicate the flow of the refrigerant.

The spring 33 is a tension spring, and biases the piston valve 32 upward. The controller 40 de-energizes the solenoid (not illustrated) when holding the changeover valve 30 at the first valve position. At this time, as illustrated in FIG. 3, the piston valve 32 is held at the uppermost end by the tensile force of the spring 33. Inside the changeover valve 30, the flow path 10*a* and the flow path 10*b* are connected to each other to provide the first circulation path 10, and the flow path 20*a* and the flow path 20*b* are connected to each other to provide the second circulation path 20. The bypass flow path 19 is blocked from the other flow paths.

The controller 40 energizes the solenoid (not illustrated) when holding the changeover valve 30 at the second valve position. The force of the solenoid lowers the piston valve 32 against the force of the spring 33. As illustrated in FIG. 4, the piston valve 32 is held at the lowermost end. Inside the changeover valve 30, the flow path 10a and the bypass flow path 19 are connected to each other, and the flow path 20a and the flow path 10b are connected to each other. In other words, the first circulation path 10 and the second circulation path 20 communicate with each other. While the refrigerant in the first circulation path 10 and the refrigerant in the second circulation path 20 are not mixed with each other when the changeover valve 30 is in the first valve position, the refrigerant in the first circulation path 10 and the refrigerant in the second circulation path 20 are mixed with each other when the changeover valve 30 is in the second valve position.

As discussed earlier, the changeover valve 30 that is in the first valve position separates the first circulation path 10 and the second circulation path 20 from each other. At this time, the controller 40 controls the first pump 13 in accordance with the temperature of the refrigerant in the first circulation path 10, and controls the second pump 23 in accordance with the temperature of the refrigerant in the second circulation path 20 independently of the control of the first pump 13. A situation occurs in which the refrigerant flows through one of the paths and the refrigerant does not flow through the other inside the changeover valve 30, when the first pump 13 is operating and the second pump 23 is not operating, or when the first pump 13 is not operating and the second pump 23 is operating. A difference in the pressure of the refrigerant occurs inside the changeover valve 30. The difference in the pressure of the refrigerant occasionally moves the piston valve 32 against the force of the spring 33.

Figure 5:
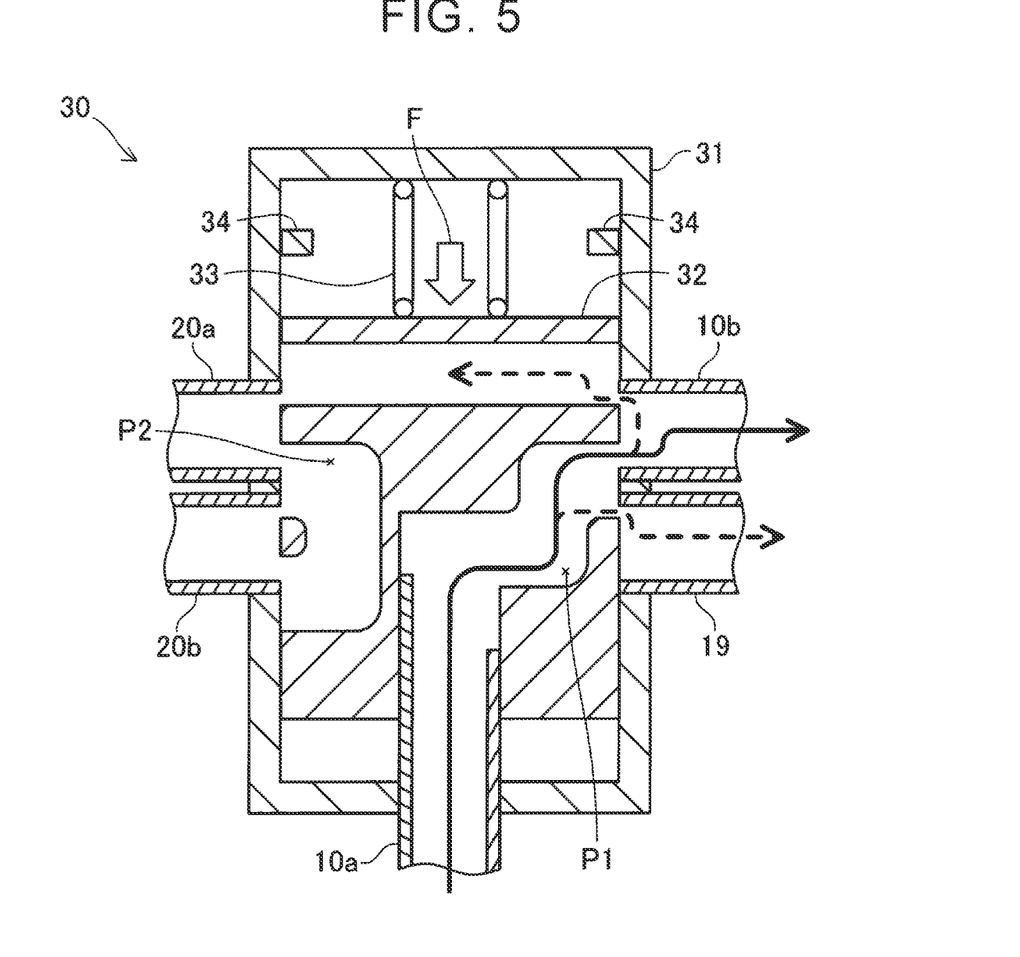
FIG. 5 is a sectional view illustrating an example of a structure of the changeover valve (at an intermediate valve position)

FIG. 5 is a sectional view of the changeover valve 30 at an intermediate valve position. The example in FIG. 5 indicates a state in which the refrigerant flows through a path P1 that connects the flow path 10a and the flow path 10b of the first circulation path 10 and the refrigerant does not flow through a path P2 that connects the flow path 20a and the flow path 20b of the second circulation path 20. Since the first pump 13 is operating and the second pump 23 is not operating, the pressure in the path P1 is higher than the pressure in the path P2. Inside the changeover valve 30, the pressure difference serves as a force F that pushes the piston valve 32 downward against the force of the spring 33 that holds the piston valve 32 at the uppermost end. The force F generated because of the pressure difference occasionally moves the piston valve 32 to an intermediate position and the refrigerant leaks from the first circulation path 10 to the second circulation path 20. The dashed arrowed lines in FIG. 5 schematically indicate the leaked refrigerant.

When the temperature difference between the refrigerants in the two circulation paths (first circulation path 10 and second circulation path 20) is small, there is no problem if the refrigerant is leaked from one of the circulation paths to the other. When the temperature difference between the refrigerants in the two circulation paths is large, however, the cooling efficiency may be lowered if the refrigerant is leaked from one of the circulation paths to the other. Thus, the controller 40 causes both the first pump 13 and the second pump 23 to operate when the temperature difference between the refrigerants in the two circulation paths is more than a predetermined temperature difference threshold. Causing both the pumps to operate reduces the pressure difference in the changeover valve 30, which suppresses a leak of the refrigerant.

Figure 6:
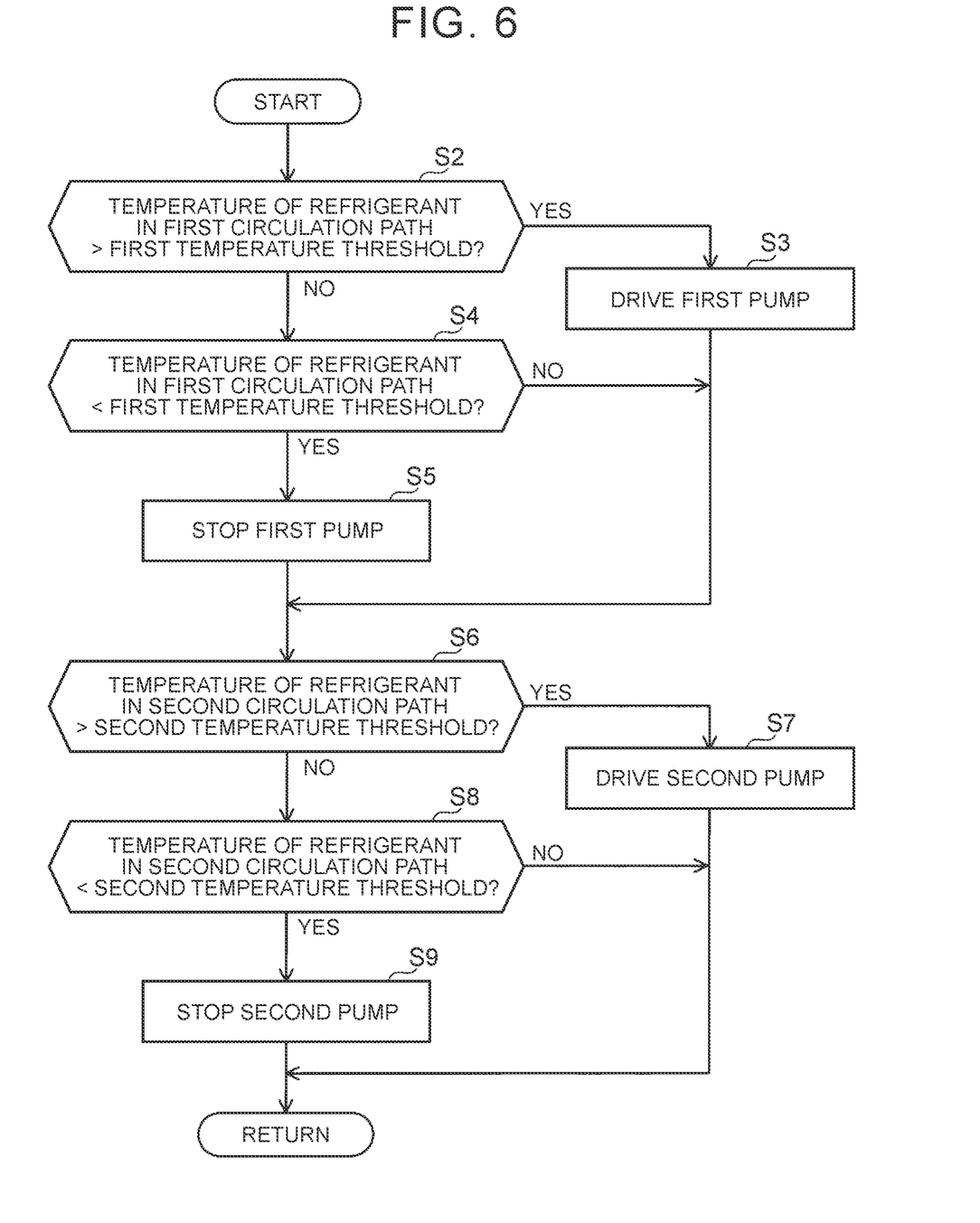
FIG. 6 is a flowchart of cooling control.

FIG. 6 is a flowchart of cooling control. FIG. 6 is a flowchart of control for keeping the temperature of the refrigerant in an appropriate temperature range. The controller 40 repeatedly performs the process in FIG. 6 at intervals of a predetermined time while the changeover valve 30 is in the first valve position.

The controller 40 compares the temperature of the refrigerant in the first circulation path 10 with the first temperature threshold (step S2). When the temperature of the refrigerant is higher than the first temperature threshold, the controller 40 drives the first pump 13 (step S2: YES, S3). When the temperature of the refrigerant is lower than the first temperature threshold, the controller 40 stops the first pump 13 (step S2: NO, S4: YES, S5). To be exact, the controller 40 stops the first pump 13 when the temperature of the refrigerant is lower than a value obtained by subtracting the margin temperature from the first temperature threshold, as discussed earlier.

Subsequently, the controller 40 compares the temperature of the refrigerant in the second circulation path 20 with the second temperature threshold (step S6). When the temperature of the refrigerant in the second circulation path 20 is higher than the second temperature threshold, the controller 40 drives the second pump 23 (step S6: YES, S7). When the temperature of the refrigerant is lower than the second temperature threshold, the controller 40 stops the second pump 23 (step S6: NO, S8: YES, S9). To be exact, the controller 40 stops the second pump 23 when the temperature of the refrigerant is lower than a value obtained by subtracting the margin temperature from the second temperature threshold, as discussed earlier.

As illustrated in FIG. 6, the controller 40 controls the first pump 13 based on the temperature of the refrigerant in the first circulation path 10, and controls the second pump 23 based on the temperature of the refrigerant in the second circulation path 20 independently of the control of the first pump 13.

Figure 7:
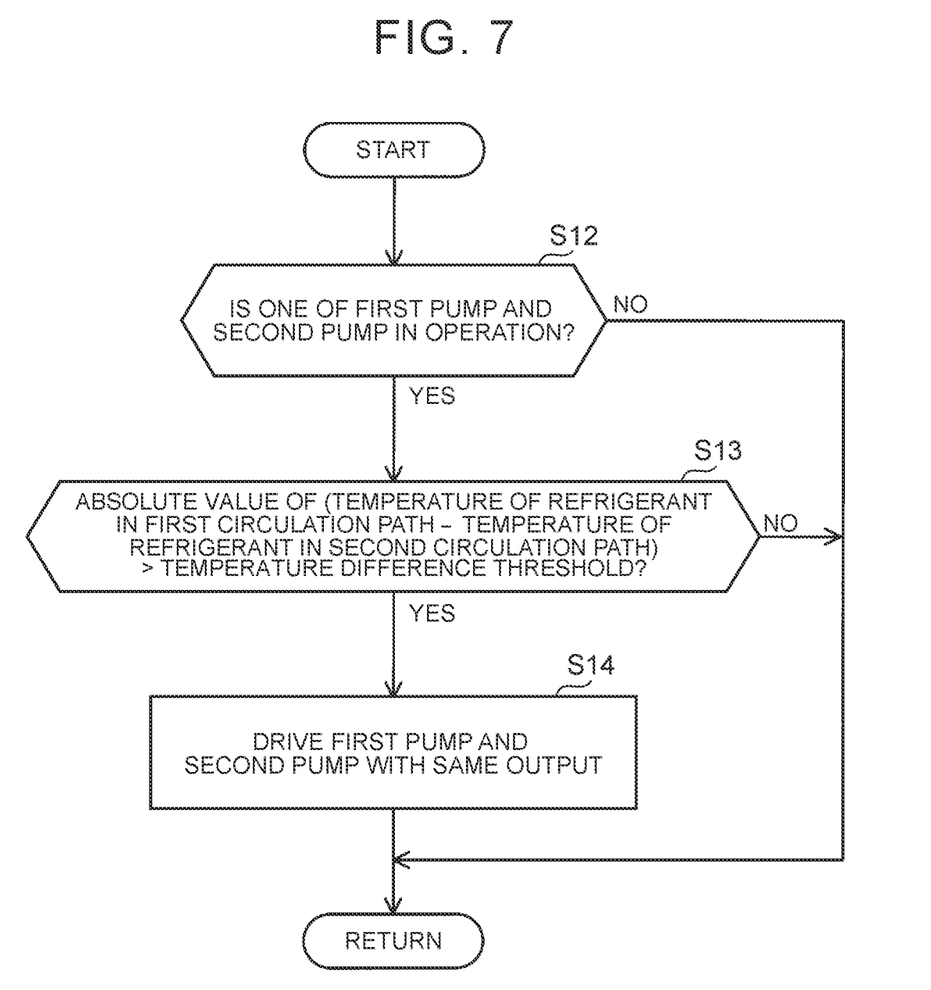
FIG. 7 is a flowchart of a process by a controller according to the first embodiment.

FIG. 7 is a flowchart of a process of suppressing a leak of the refrigerant. The controller 40 repeatedly executes the process in FIG. 6 in constant cycles when the changeover valve 30 is set to the first valve position. The controller 40 repeatedly executes the process in FIG. 7 independently of the process in FIG. 6. The controller 40 checks whether one of the first pump 13 and the second pump 23 is in operation (step S12). When both the first pump 13 and the second pump 23 are operating, or both are not operating, the controller 40 ends the process without taking any action (step S12: NO, return).

When only one of the first pump 13 and the second pump 23 is operating, the controller 40 compares the difference between the temperature of the refrigerant in the first circulation path 10 and the temperature of the refrigerant in the second circulation path 20 with a predetermined temperature difference threshold (step S12: YES, S13). When the temperature difference is less than the temperature difference threshold (step S13: NO), the controller 40 ends the process. When the temperature difference is more than the temperature difference threshold (step S13: YES), on the other hand, the controller 40 causes both the first pump 13 and the second pump 23 to operate (step S14). At this time, the controller 40 drives the first pump 13 and the second pump 23 with the same output. When the temperature difference between the refrigerants is large and one of the pumps is operating and the other is not operating, the controller 40 drives the two pumps with the same output. This process reduces the pressure difference in the changeover valve 30, which suppresses a leak of the refrigerant in the changeover valve 30.

Step S5 or S9 in FIG. 6 is skipped when step S14 is executed. That is, when the temperature difference between the refrigerant in the first circulation path 10 and the refrigerant in the second circulation path 20 is more than the temperature difference threshold, the controller 40 causes both the first pump 13 and the second pump 23 to operate, irrespective of the temperature of the refrigerant in the first circulation path 10 and second circulation path 20.

Second Embodiment

Figure 8:
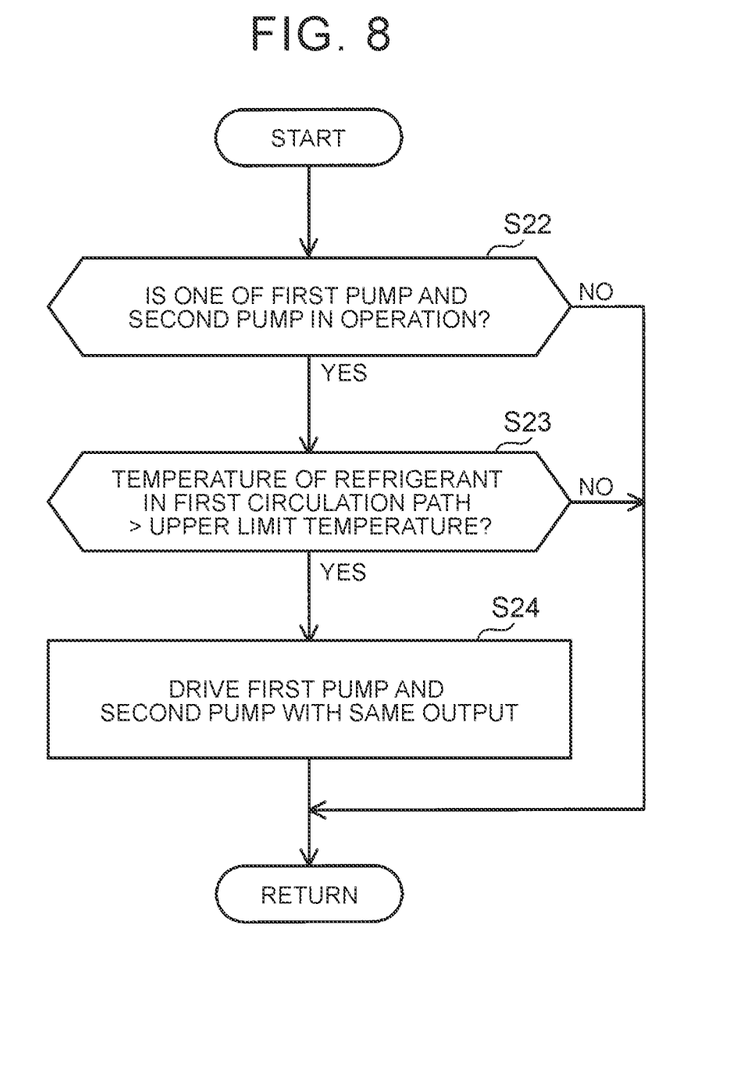
FIG. 8 is a flowchart of a process by a controller according to a second embodiment.

A thermal management system according to a second embodiment will be described. The hardware configuration of the thermal management system according to the second embodiment is the same as that of the thermal management system 2 (see FIGS. 1 and 2) according to the first embodiment. FIG. 8 is a flowchart of a process executed by the controller 40 of the thermal management system according to the second embodiment. The controller 40 repeatedly executes the process in FIG. 8 in constant cycles when the changeover valve 30 is in the first valve position. The controller 40 executes the process in FIG. 8 concurrently with the process in FIG. 6.

The controller 40 checks whether one of the first pump 13 and the second pump 23 is in operation (step S22). When both the first pump 13 and the second pump 23 are operating, or both are not operating, the controller 40 ends the process without taking any action (step S22: NO, return).

When only one of the first pump 13 and the second pump 23 is operating, the controller 40 compares the temperature of the refrigerant in the first circulation path 10 with a predetermined upper limit temperature (step S22: YES, S23). When the temperature of the refrigerant in the first circulation path 10 is lower than the predetermined upper limit temperature (step S23: NO), the controller 40 ends the process. When the temperature of the refrigerant in the first circulation path 10 is higher than the upper limit temperature (step S23: YES), on the other hand, the controller 40 causes both the first pump 13 and the second pump 23 to operate (step S24). The first circulation path 10 (first cooler 12) cools the motor 11, and thus the temperature of the refrigerant is high. On the other hand, the second circulation path 20 (second cooler 22) cools the power source 21. The upper limit temperature of the motor 11 is much higher than the upper limit temperature of the power source 21. That is, when the temperature of the refrigerant in the first circulation path 10 is higher than the upper limit temperature, it is highly probable that the temperature difference between the refrigerant in the first circulation path 10 and the refrigerant in the second circulation path 20 is more than the temperature difference threshold. In such a case, the controller 40 drives both the first pump 13 and the second pump 23 (step S23: YES, S24). Also in this case, the pressure difference inside the changeover valve 30 is reduced, which suppresses a leak of the refrigerant inside the changeover valve 30.

Also in the second embodiment, step S5 or S9 in FIG. 6 is skipped when step S24 is executed. That is, when the temperature of the refrigerant in the first circulation path 10 is higher than the upper limit temperature, the controller 40 causes both the first pump 13 and the second pump 23 to operate, irrespective of the temperature of the refrigerant in the first circulation path 10 and second circulation path 20.

As has been described above, the thermal management system 2 can suppress a leak of the refrigerant when the temperature difference between the refrigerants is large in the changeover valve 30 that switches between the flow paths.

The state in which one of the pumps is operating and the other is not operating may be continued when the temperature difference between the refrigerants is small.

Points to be noted regarding the technology described in the embodiments will be described. The motor 11 for travel corresponds to an example of the first heat source. The power source 21 corresponds to an example of the second heat source.

The structure of the changeover valve in which a leak of the refrigerant may occur is not limited to the structure in FIGS. 3 to 5. It is widely known that a liquid (refrigerant) can leak from a changeover valve. The technology disclosed herein is applicable to changeover valves structured as indicated in JP 2021-42809 A and JP 2020-200943 A.

While specific examples of the present disclosure have been described in detail above, these are merely exemplary, and are not intended to limit the scope of the claims. The technology described in the claims includes various modifications and alterations of the specific examples indicated above. The technical elements described in the present specification or the drawings have technical utility alone or in various combinations, and are not limited to the combinations described in the claims as originally filed. In addition, the technology indicated in the present specification or the drawings may achieve a plurality of objects at the same time, and has technical utility by achieving one of such objects by itself.

What is claimed is:

1. A thermal management system comprising:
    a first heat source;
    a second heat source;
    a first pump;
    a second pump;
    a first cooler that cools the first heat source;
    a first circulation path that connects the first cooler to the first pump;
    a second cooler that cools the second heat source;
    a second circulation path that connects the second cooler to the second pump;
    a changeover valve moveable between a first valve position and a second valve position, in the first valve position of the changeover valve the first circulation path and the second circulation path are separated from each other, and in the second valve position the first circulation path and the second circulation path communicate with each other; and
    an electronic control unit configured to cause both the first pump and the second pump to operate when:
        a temperature difference between a refrigerant in the first circulation path and a refrigerant in the second circulation path is more than a predetermined temperature difference threshold,
        one of the first pump and the second pump is operating and the other one of the first pump and the second pump is not operating, and
        the changeover valve is set to the first valve position.

2. The thermal management system according to claim 1, wherein:
    the first heat source is a motor for travel, and the second heat source is a power source that supplies electric power to the motor; and
    when the temperature of the refrigerant in the first circulation path is higher than a predetermined upper limit temperature, the electronic control unit is configured to determine that the temperature difference is more than the predetermined temperature difference threshold and causes the first pump and the second pump to operate.

3. The thermal management system according to claim 2, wherein the predetermined upper limit temperature for the refrigerant in the first circulation path is higher than an upper limit temperature for the refrigerant in the second circulation path.

4. The thermal management system according to claim 1, wherein:
the first heat source is a motor for travel, and the second heat source is a power source that supplies electric power to the motor; and
the electronic control unit is configured to stop the second pump when the temperature of the refrigerant in the second circulation path is lower than a predetermined temperature threshold, and when the changeover valve is in the first valve position, and
cause both the first pump and the second pump to operate, irrespective of the temperature of the refrigerant in the second circulation path, when the temperature difference is more than the predetermined temperature difference threshold.

5. The thermal management system according to claim 1, wherein the electronic control unit drives both the first pump and the second pump with a same output.

6. The thermal management system according to claim 1, wherein the electronic control unit is configured to cause both the first pump and the second pump to maintain their current state when:
(i) the temperature difference between the refrigerant in the first circulation path and the refrigerant in the second circulation path is more than the predetermined temperature difference threshold;
(ii) when both the first pump and the second pump are operating or both the first pump and the second pump are not operating; and
(iii) the changeover valve is set to the first valve position.

7. The thermal management system according to claim 1, wherein the electronic control unit is configured to cause driving and stopping of the first pump based on the temperature of the refrigerant in the first circulation path, and
wherein the electronic control unit is configured to control driving and stopping of the second pump based on the temperature of the refrigerant in the second circulation path independently of the control of the first pump.

8. The thermal management system according to claim 7, wherein the electronic control unit is configured to drive both the first pump and the second pump when:
(i) the changeover valve is in the first position;
(ii) one of the first pump and the second pump is operating and the other of the first pump and the second pump is not operating; and
(iii) the temperature difference between the refrigerant in the first circulation path and the refrigerant in the second circulation path is more than the predetermined temperature difference threshold.

9. The thermal management system according to claim 8, wherein the electronic control unit is configured to drive both the first pump and the second pump without switching the changeover valve between the first valve position and the second valve position.

* * * * *